United States Patent [19]

Carter

[11] 4,120,379
[45] Oct. 17, 1978

[54] TREE STAND AND SEAT

[76] Inventor: Samuel E. Carter, Rte. 4, Box 263, Leitchfield, Ky. 42754

[21] Appl. No.: 826,518

[22] Filed: Aug. 22, 1977

[51] Int. Cl.² ............................................. A47C 9/10
[52] U.S. Cl. ................................................. 182/187
[58] Field of Search ............................. 182/187, 188

[56] References Cited

U.S. PATENT DOCUMENTS

| 3,006,433 | 10/1961 | Farver | 182/187 |
| 4,009,763 | 3/1977 | Hunter | 182/187 |

Primary Examiner—Reinaldo P. Machado
Attorney, Agent, or Firm—Harrington A. Lackey

[57] ABSTRACT

A combination tree stand and seat structure including an upright frame member to which are hinged in vertically spaced relationship a platform member and seat member. The seat member and platform member are normally suspended in their horizontal operative positions from the frame member by cables. The first ends of a pair of suspension cables are fixed to the top end portion of the frame member, while the suspension cables are wrapped in opposite directions about the tree with their second ends detachably connected to opposite sides of the frame member at the top, for holding the structure in an elevated operative position.

By disconnecting the second ends of the suspension cables from the top connectors and detachably connecting them to connectors on opposite sides of the lower portion of the frame member, and by folding up both the seat member and the platform member against the frame member, the structure is readily carried upon the back of the hunter or user of the structure.

4 Claims, 3 Drawing Figures

U.S. Patent   Oct. 17, 1978   4,120,379
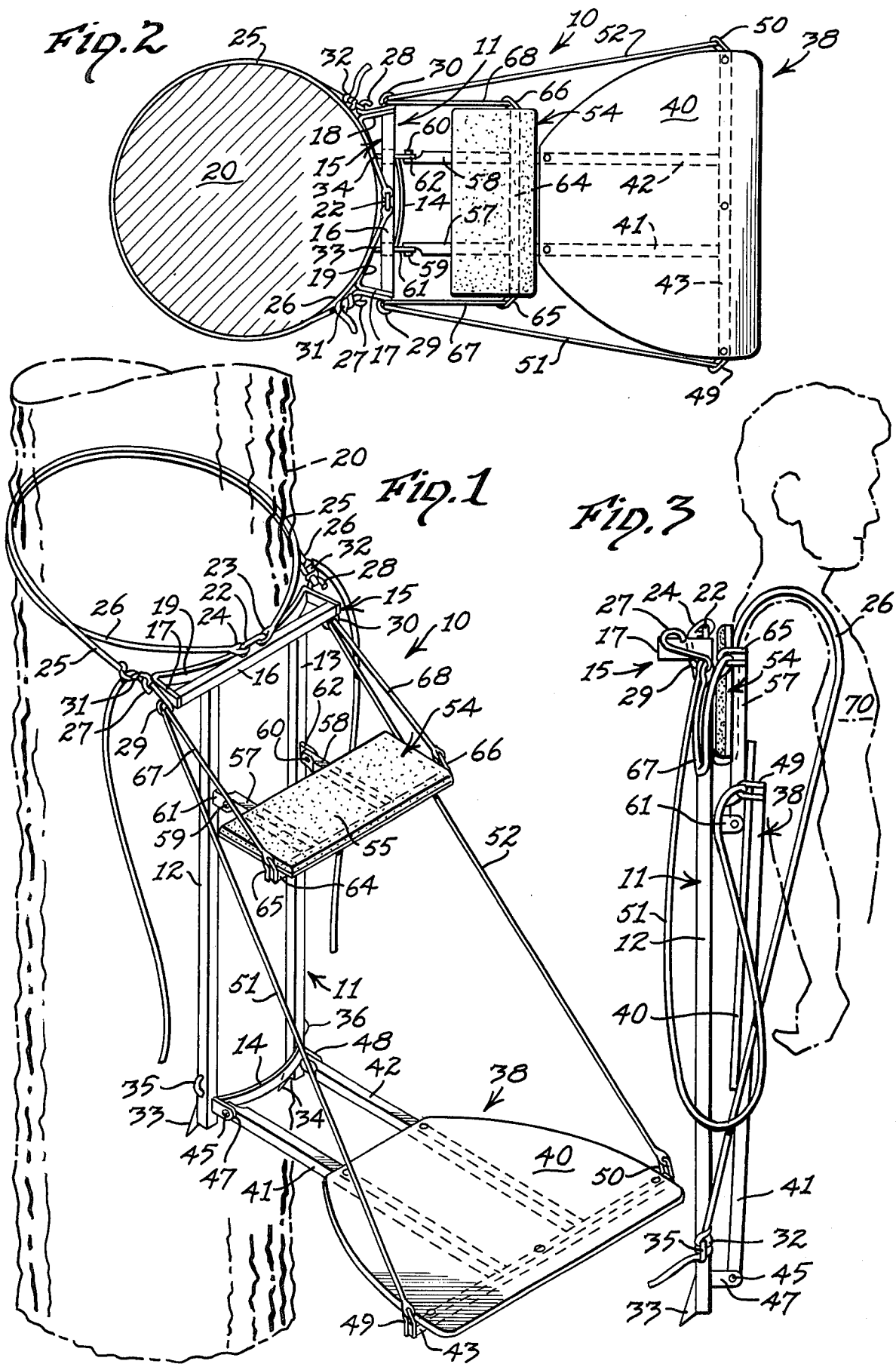

TREE STAND AND SEAT

BACKGROUND OF THE INVENTION

This invention relates to a tree stand, and more particularly to a portable combination tree stand and seat structure.

Tree stands and seats of various constructions, particularly adapted for use by hunters to support the hunter in an elevated position upon a tree, are well-known in the art, as evidenced by the following U.S. patents: U.S. Pat. No. 3,065,821, Hundley, Jr., Nov. 27, 1962; U.S. Pat. No. 3,115,213, Cloutier, Dec. 24, 1963; U.S. Pat. No. 3,340,828, Smith et al, Sep. 12, 1967; U.S. Pat. No. 3,460,649, Baker et al, Aug. 12, 1969; U.S. Pat. No. 3,485,320, Jones, Dec. 25, 1969; U.S. Pat. No. 3,730,294, Thurmond, May 1, 1973; U.S. Pat. No. 3,817,350, Gray, June 18, 1974; U.S. Pat. No. 3,990,536, Wilburn, Nov. 9, 1976.

The above Cloutier, Smith, Thurmond and Gray patents disclose tree-supported seat structures per se.

Baker and Jones disclose tree stands per se.

Wilburn discloses a sheltered tree-mounted seat.

The above Hundley U.S. Pat. No. 3,065,821 is the only one of the above patents which discloses a combined tree stand and seat, which is collapsible for carrying upon the back of the user. However, the seat member 14 of the Hundley patent is supported in its horizontal operative positon by a tree-engaging brace member 34, while the platform 16 is suspended in its operative standing position by cables 46 which are attached to the seat member 14, instead of a common frame member. Thus, when the brace member 45 is removed to permit the seat member 14 to collapse to an inoperative position, the platform member 16 will also collapse. Furthermore, the strap members 22 and 24 of the Hundley patent are designed to be supported over only one shoulder of the user when the device is carried in its collapsed position.

SUMMARY OF THE INVENTION

It is therefore an object of this invention to provide a combination tree stand and seat structure adapted to be supported or suspended from a tree in an elevated position, and which is also portable upon the back of the user.

Furthermore, the combined tree stand and seat structure of this invention permits either or both the seat member and the platform member to be independently moved to its operative position, regardless of the position of the other member. For example, the platform member may be moved to its operative standing position, while the seat member may be folded or swung to its inoperative, collapsed position; or vice versa.

It is another object of this invention to provide a combination tree stand and seat structure in which a pair of flexible linear suspension members are provided for either wrapping arond a tree to support the device in an elevated position upon the tree, or to be reconnected to function as pair of shoulder straps for supporting the device in its inoperative, collapsed position upon the back of the user.

More specifically, the combined tree stand and seat structure comprises an upright frame member, to the bottom of which a platform member is hingedly connected, and to which a seat member is hingedly connected above the platform member. Both the platform member and seat member are suspended by cables or other flexible linear members directly to the frame member to permit independent swinging movement of either, or both, the seat member and the platform member relative to the frame member.

A pair of suspension cables or flexible linear members are fixed at one end to the top of the frame member and adapted to be wrapped around the tree in opposite directions so that their respective free or second ends are adapted to be detachably connected to first connectors at the top of the frame member. These free ends may also be detached from the first connectors to remove the device from the tree, and then reconnected to lower second connectors near the bottom of the frame member to provide shoulder straps on opposite sides of the frame member for supporting the frame member upon the back of the user. Before the frame member is mounted upon the back of the user for portability, both the platform member and the seat member are swung or folded upward against the frame member and held in their raised positions between the back of the user and the frame member.

BRIEF DESCRIPTION OF THE DRAWINGS

FIG. 1 is a top, front, perspective view of the device made in accordance with this invention, in operative position suspended upon a tree trunk in an elevated position, with the seat member and platform member in their respective operative positions;

FIG. 2 is top plan view of the device disclosed in FIG. 1, with the tree trunk shown in section, and FIG. 3 is a side elevation of the device in its collapsed inoperative position mounted upon the back of the user.

DESCRIPTION OF THE PREFERRED EMBODIMENT

Referring now to the drawings in more detail, the combined tree stand and seat structure or device 10 made in accordance with this invention includes an elongated, normally upright frame member 11. The frame member 11 is disclosed as elongated and relatively narrow, including a pair of elongated tubular side members 12 and 13. The bottom ends of the side members 12 and 13 are held in fixed spaced relationship by the lower hinge bracket or transverse strap member 14. The upper or top ends of the tubular side members 12 and 13 are fixed in spaced relation, to an elongated transverse yoke member 15.

The yoke member 15 includes an elongated substantially straight, tubular, top transverse bar 16 of a length greater than the width of the frame member 11 across the tubular side members 12 and 13. Fixed to the rear of the straight tob bar 16 is a piece of strap metal bent to form the side frame pieces 17 and 18 and the rear arcuate seat member 19 convex rearward to fit against the circumferential portion of a tree 20 upon which the device 10 is adapted to be suspended or hung.

Fixed to the middle portion of the top transverse bar 16 is a connector loop 22. Fixed to the connector loop 22 are the looped ends 23 and 24 of suspension cables 25 amd 26, respectively, or any other convenient type of flexible linear member, such as rope, chain, etc.

Fixed to the outside of the side pieces 17 and 18 of the yoke member 15, respectively, are a pair of connector pieces. Each connector piece has a rear hook 27 and 28, respectively, and a front connector loop 29 and 30, respectively.

As best disclosed in FIGS. 1 and 2, the suspension cable 25 is wrapped around the tree trunk 20 counterclockwise, as viewed in FIG. 2, and its free end 31 is looped or tied about the rear hook 27. The suspension cable 26 is also wrapped, but in the opposite direction, clockwise as viewed in FIG. 2, about the tree trunk 20. The opposite or free end 32 of the cable 26 is looped or tied about the rear hook 28. In this manner, the frame member 11, as well as the entire device 10 may be securely held, or hung, upon the tree 20 in the desired elevated position.

In order to assist the cables 25 and 26, a pair of cleats 33 and 34 are mounted on the rear surfaces of the side frame members 12 and 13, and the cleats 33 and 34 are provided with sharp points, so that they can be inserted into the surface of the tree 20 to prevent the frame member 11 from slipping down upon the tree trunk 20.

On the lower outside surfaces of each of the tubular side members 12 and 13 is formed or fixed lower connector loops 35 and 36, respectively, for a purpose to be described later.

Supported for vertical swinging movement upon the lower end portion of the frame member 11 is the platform member 38. Platform member 38 includes a planar platform 40, such as a sheet of plywood, fixed upon a frame including a pair of parallel arms 41 and 42 fixed to a front transverse bar or member 43. The rear ends of the frame arms 41 and 42 are journaled by coaxial, transverse pins 45 and 46 to the forward projecting ears 47 and 48 of the hinge bracket 14.

Fixedly secured to cconnector loops 49 and 50 at each end of the front frame member 43 are platform support cables 51 and 52. The upper ends of the cables 51 and 52 are secured by tying, or by loops formed in the ends of the cables 51 and 52, or by other convenient connectors, to the loop connectors 29 and 30, so that the platform 40 will be suspended in a substantially horizontal position when the frame member 11 is in substantially vertical position upon the tree 20, with the platform cables 51 and 52 fully extended.

The seat member 54 includes a substantially planar, preferably rectangular, padded seat 55 fixed upon a pair of parallel frame arms 57 and 58, the rear ends of which are pivotally connected by coaxial, transverse hinge pins 59 and 60 to ears 61 and 62 fixed to the front surface of the tubular side members 12 and 13. The seat frame arms 57 and 58 are connected at their forward ends by an elongated transverse front frame bar or member 64.

Fixed to the opposite ends of the front transverse bar 64 are a pair of loop connectors 65 and 66. The front ends of seat support cable 67 and 68 are tied or otherwise looped or connected to the loop connectors 65 and 66. The rear ends of the cables 67 and 68 are also tied or looped or otherwise fastened to the same loop connectors 29 and 30 that the rear ends of the platform cables 51 and 52 are secured. The length of the seat cables 67 and 68 are such that they will be fully extended when the seat 55 is swung to its horizontal operative seating position, when the frame member 11 is supported in an upright substantially vertical position by the suspension cables 25 and 26.

Independently hinged at vertically spaced positions upon the same frame member 11, and independently supported by platform cables 51 and 52 and seat cables 67 and 68, the platform member 38 and the seat member 54, respectively, may be swung about their respective transverse or pivotal horizontal axes quite independently of each other. Thus, both the seat member 54 and the platform member 38 may be swung to their horizontal operative positions, as disclosed in FIGS. 1 and 2 at the same time. The seat member 54 and platform member 38 may both be swung to their collapsed upright positions against the frame member 11, at the same time, as indicated in FIG. 3. Furthermore, the seat member 54 may be swung to its upright collapsed position, while the platform member 38 remains in its operative standing position, or vice versa.

When it is desired to use the device 10, it may be carried to an elevated position on the tree 20 by the user or hunter climbing the tree, or it may be hoisted to the desired position by a hoisting cable, not shown. The device 10 is supported at the desired elevated position, such as that disclosed in FIG. 1, by wrapping the cables 25 and 26 in opposite directions, as shown, pulling the cables 25 and 26 taut, and securing the free ends 31 and 32 of the respective cables to the top rear connectors 27 and 28. Rearward pressure may be exerted upon the bottom portion of the frame member 11 in order to force the cleats 33 and 34 into the surface of the tree 20.

Both the platform member 38 and the seat member 54 may be swung downward to their operative horizontal positions. The hunter or user of the device 10 may then stand upon the horizontal platform 40, or may sit upon the horizontal seat 55 with his feet resting upon the platform 40. Should the hunter or user of the device 10 prefer to stand and enjoy more standing room, he may push the seat member 54 upward causing it to swing about its hinge pins 59 and 60 to an upright position collapsed against the upper portion of the frame member 11.

After the hunter is through with the device 10, he may stand upon an adjacent limb or bough of the tree 20, or upon a ladder, or may grip his legs about the tree 20, while disconnecting the free ends 31 and 30 from the respective connectors 27 and 28. After the cables 25 and 26 are disconnected, the frame 11 may be easily moved forward to disengage the cleats 33 and 34, and the entire device 10 may be lowered to the ground.

Upon the ground, the hunter may connect the free end 32 of the cable 26 to the opposite lower connector 35, as best disclosed in FIG. 3. The free end 31 of the cable 25 is also connected to the other lower connector 36, in a similar manner, to provide shoulder loops for supporting the device 10 upon the back of the user or hunter 70.

However, before the device 10 is mounted upon the back of the hunter 70, both the platform member 38 and the seat member 54 are folded upward to their collapsed positions, as disclosed in FIG. 3, to be held in those positions between the back of the hunter 70 and the frame member 11. With the shoulder loops 25 and 26 over the shoulders of the hunter 70, the entire device 10 can be easily carried on the back of the hunter from one place to another.

In a preferred form of the invention, the frame members 12, 13, 16, 41, 42, 43, 57, 58 and 64 are made of lightweight tubular stock, such as aluminum tubular stock, to reduce the overall weight of the device 10 and thereby improve its portability.

It will be understood that all of the connectors 22, 27, 28, 29, 30, 35, 36, 49, 50, 65 and 66 may be of different forms so long as they carry out their respective functions of securing the ends of the respective cables in their operative positions.

The free ends 31 and 32 of the suspension cables 25 and 26, respectively, may also be provided with detachable connectors for engaging the corresponding connectors 27 and 28, rather than being tied in knots, as shown.

It is also important to the successful operation of the device 10, that the front edge of the seat 55 may be substantially behind the front edge of the platform 40, to enable the hunter 70 to sit comfortably upon the seat 55 with his feet resting upon the platform 40. For the same reason, the seat 55 is spaced above the platform 40 a sufficient distance to permit the hunter 70 to be comfortably seated upon the seat 55 with his feet resting comfortably upon the platform 40, when the seat member 54 and the platform member 38 are in their operative horizontal positions.

In the preferred form of the invention, the seat 55 is preferably padded to render the seat more confortable to the seated hunter 70, particularly for extended periods of time. Although the bottom surface of the seat 55 is not disclosed as being padded, nevertheless it could be padded in order to render the bottom surface of the seat 55 more comfortable to the back of the hunter 70 when the device 10 is carried upon his back, as disclosed in FIG. 3.

What is claimed is:

1. A combination tree stand and seat structure comprising:
    (a) a normally upright frame member having opposite sides, top and bottom end portions, and a normally vertical axis,
    (b) first and second flexible linear suspension members having respectively first and second ends,
    (c) means fixing said first ends to the top end portion of said frame member,
    (d) a first pair of connectors fixed to the top end portion of said frame member,
    (e) a pair of second connectors, each second connector being fixed to an opposite side of the bottom end portion of said frame member,
    (f) the second ends of said linear suspension members being adapted to be detachably connected to said first connectors or to said second connectors,
    (g) a platform member having front and rear portions,
    (h) lower hinge means on the bottom end portion of said frame member connected to the rear end portion of said platform member to support said platform member for swinging movement about an axis transverse to said vertical axis,
    (i) first support means on said frame member connected to said platform member to limit the downward swinging movement of said platform member to an operative planar position substantially normal to said vertical axis,
    (j) a seat member having front and rear portions,
    (k) upper hinge means on said frame member above said lower hinge means connected to the rear end portion of said seat member to support said seat member for swinging movement about an axis transverse to said vertical axis, and
    (l) second support means on said frame member connected to said seat member to limit the downward swinging movement of said seat member to an operative planar sitting position substantially normal to said vertical axis and spaced above said platform member a distance to permit a person to sit upon said seat member with his feet upon said platform member.

2. The invention according to claim 1 in which the first ends of said linear suspension members are fixed to the top portion of said frame member near the middle thereof, one first connector being fixed to one side of the top portion of said frame member and the other first connector being fixed to the opposite side of the upper portion of said frame member, said linear suspension members being adapted to be wrapped in opposite directions about a tree when their second ends are connected to said opposite first connectors, respectively, to suspend said frame member upon said tree; said linear suspension members, when their second ends are connected to said opposite second connectors, respectively, being adapted to function as shoulder straps for supporting said frame member upon the back of a person.

3. The invention according to claim 2 further comprising a transverse yoke member forming a part of the top portion of said frame member and having a rear arcuate surface, convex rearward, adapted to conform to the circumferential surface of a tree upon which the frame member is adapted to be supported, said yoke member having a width substantially greater than the remaining portion of said frame member, the first ends of said linear suspension members being fixed to said yoke member, and said first connectors being fixed to oppposite sides of said yoke member.

4. The invention according to claim 3 in which said first support means comprises a pair of first flexible linear support members having front and rear ends, means securing the front ends of said first support members to the front portion of said platform member, and means fixing the rear ends of said first support members to said yoke member, said second support means comprising a pair of second flexible linear support members having front and rear ends, means fixing the front ends of said second support members to opposite sides of the front of said seat member and means fixing the rear ends of said second support members to said yoke member.

* * * * *